Dec. 13, 1938.                    P. KLEID                    2,139,961
SEDIMENT REMOVER
Filed April 24, 1937
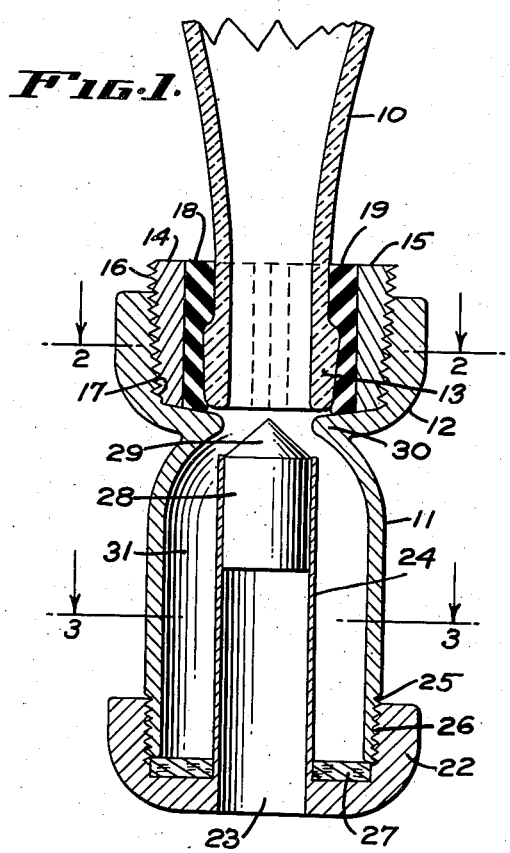
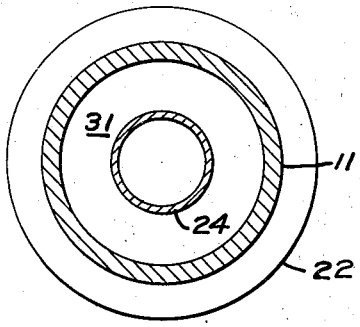
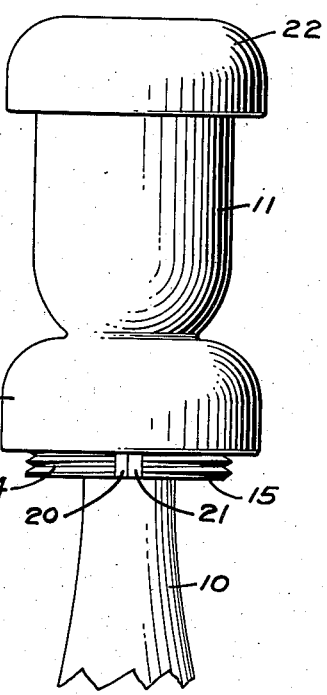
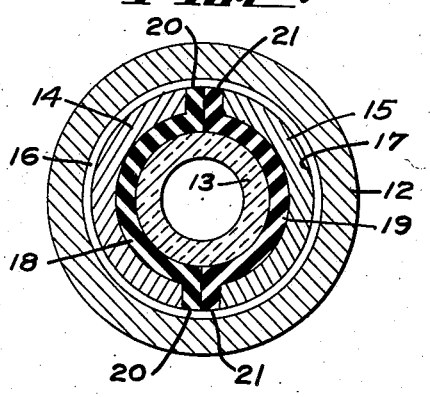
INVENTOR.
PETER KLEID
BY Charles M. Pryer
ATTORNEY.

Patented Dec. 13, 1938

2,139,961

UNITED STATES PATENT OFFICE 2,139,961

SEDIMENT REMOVER

Peter Kleid, San Francisco, Calif.

Application April 24, 1937, Serial No. 138,774

4 Claims. (Cl. 210—57)

This invention relates to the separation of sediment from liquids with which it occurs.

Fermentation usually results in the formation of sediment which is also formed in some other types of processes; and the processed liquor is frequently desired free from sediment. It is the practice in certain instances, as in the manufacture of champagne, to have the sediment-forming process take place in a multiplicity of comparatively small batches in individual containers, and my invention is particularly applicable but not necessarily restricted to the separation of sediment formed thereby. It may be desirable to remove the sediment without contamination of the liquid by contact with the atmosphere or by organisms in the air, as in the case of physiological preparations, and it may be desirable to permit the fermentation or other gas-forming process to proceed in a sealed container with conservation of the gas formed and a build-up of pressure thereby as, for example, in the manufacture of champagne.

Objects of this invention are to provide a device: which may be used for the separation of solids and more particularly slowly settling solids, from liquids without undue exposure or loss of gas; which permits such separation within a sealed space; which seals the reaction container and permits of turning or otherwise moving it to keep the reacting liquid stirred during the process and which may be left in sealing engagement with the container to receive the sediment formed by the reaction; which may be attached to a container to form a two-part sealed vessel and receive sediment from said container and then be removed from said container without unsealing it; which carries a member that may be removed therefrom and into the container orifice to seal it whereby the device may be removed from the sealed container without unsealing it; to provide an adapter which permits the new device to be used as aforesaid with bottles or other containers; to provide devices and adapters of the kind referred to which are efficient and may be quickly assembled with and disassembled from the containers; and other objects will become apparent on reading this specification taken in connection with the accompanying drawing which forms a part thereof.

Such drawing shows an exemplification of the invention which is illustrative of the principles involved. Of the figures thereon, Fig. 1 is a vertical section of a device constructed according to the present invention and operatively connected to a bottle which is partly broken away, Fig. 2 is a section on line 2—2 of Fig. 1, Fig. 3 is a section on line 3—3 of Fig. 1, and Fig. 4 is an elevation showing the invention just after having been applied to a bottle which is partly broken away.

The device is shown as attached to and sealing a bottle 10. It comprises a hollow body portion 11 which carries a means to attach it to the bottle, which comprises a portion 12 which is a continuation of the hollow body portion 11 and surrounds the bottle neck 13. Between the portion 12 and the bottle neck is an adapter which may comprise two parts 14, 15 which have corresponding threads 16 on the outer faces thereof to register with corresponding threads 17 on the inner face of the part 12. Between the parts 14, 15 and the bottle neck there may be a gasket means to make a tight joint, which is preferably of rubber, cork, or other somewhat flexible material not injuriously affected by or affecting the bottle contents. The adapted parts 14, 15 are arcuate in shape but not quite long enough to meet each other in order to provide gasket spaces between the ends thereof. The gasket means may consist of two members having arcuate parts 18, 19 positioned between the bottle neck 13 and the arcuate adapter members 14, 15, and these arcuate parts have flange parts 20, 21 at each end thereof to fit against each other in the spaces between the ends of the arcuate members 14, 15.

The lower end of the hollow body portion 11 is open and adapted to receive removably a sealing cover 22. This cover has a circular orifice 23 therethrough centrally thereof. A hollow tubular member 24 located about said orifice 23 is connected by a liquid-tight joint with the cover 22, being preferably unitary therewith, and it extends upwardly, as shown on Fig. 1, to a point adjacent to but spaced from the bottle mouth.

The lower end of the body member 11 has threads 25 exteriorly thereof to accommodate the threads 26 interiorly of the cover 22. A flexible sealing ring 27, made of cork, rubber, or other suitable material not injuriously affected by or affecting the contents of the bottle, is positioned at the lower end of the interior of the cover, so that the lower end of the body portion 11 may abut thereagainst and make a liquid-tight joint therewith. A stopper 28 of cork, rubber, or other suitable material, preferably having a tapered end 29, is positioned within the tubular member 24. There may be a constriction 30 where the body member 11 meets the portion 12.

My invention may be used by placing the materials which are to undergo the fermentation or other process (biological, physiological, chemical, etc.) which results in the formation of sediment, in the bottle 10 while it is in ordinary upright position. The gasket members 18, 19 are then placed about the bottle neck and the arcuate members 14, 15 are then placed about the gasket members with the gasket flanges between the ends thereof. The member 12 is then screwed down upon the adapter thereby sealing the bottle. The fermentation or other reaction is then allowed to proceed in the conventional manner up to the desired point and the bottle 10 may be positioned, turned, shaken or otherwise moved as is customary for the particular reaction. In the manufacture of champagne it is customary to permit the last part of the fermentation to take place in the bottles in which it is to be sold, with the bottles sealed; and this involves difficulty and special apparatus for removing the sediment formed without loss of carbon dioxide.

With the present invention, the procedure is simple and easy. After the reaction has proceeded to the desired point, the assembly is allowed to rest, inverted, as shown on Fig. 1, whereby the sediment slowly settles down past the tapered end of the stopper 28 into the annular chamber 31. The assembly is permitted to rest in inverted position long enough to permit as much as desired of the sediment to leave the bottle and enter the annular chamber 31, and when this has occurred the stopper 28 is pushed up into the neck of the bottle to seal it, and the device is removed from the bottle. In this manner the bottle is sealed by the device, and while so sealed the sediment is moved into the device and the bottle is then sealed independently, so that the device may be removed from the bottle without unsealing it. The device may then be cleaned and used anew.

The constriction 30 may be omitted but when present is useful in maintaining a sufficient distance between the mouth of the bottle and the upper end of the inner wall 24, and it may also serve to help guide the stopper 28 in its movement into the bottle neck. The stopper 28 is preferably long enough to be guided by the conduit wall 24 and the constriction 30 or by said conduit wall alone in its movement into the bottle neck. Tapering and polishing the end of the stopper as at 29 minimizes the amount of sediment resting upon the stopper.

I have referred to certain details for the purpose of illustrating and describing the invention, but it is to be understood that some of these may be changed without departing from the spirit thereof and that any suitable mechanical devices may be used for the purpose of holding the stopper in position to prevent high pressures from blowing it out or to force the stopper into the bottle or other container.

I claim:

1. A device for attachment to a container having an orifice, comprising a second container having an orifice and means to connect said orifices together, said second-mentioned container having an opening in line with said orifice thereof, and a sealing member in said opening adapted to be moved into and to seal said first-mentioned orifice.

2. A device for attachment to a container having an orifice, comprising a second container having an orifice and means to connect said orifices together, said second container having an opening, a stopper sealing said opening, said stopper being adjacent to, in line with, adapted to fit and be moved into said first-mentioned orifice, and having sufficient length to enter into and fit said orifice before separation from said second-mentioned container.

3. A device for attachment to a container having an orifice, comprising a second container having an outer wall, an inner hollow wall forming a conduit open at both ends, a wall connecting said outer and inner walls at the lower end of said device, said walls forming an annular chamber, said outer wall projecting above the upper end of said inner wall, a stopper fitting within said conduit formed by said inner wall at the upper end thereof, and means to connect said first-mentioned container to said outer wall with said orifice spaced from and in line with said stopper.

4. A device for attachment to a container having an orifice, comprising a second container having an outer wall, an inner hollow wall forming a conduit open at both ends, a wall connecting said outer and inner walls at the lower end of said device, said walls forming an annular chamber, said outer wall projecting above the upper end of said inner wall, a stopper having a tapered end and fitting within said conduit formed by said inner wall, said tapered end projecting beyond the upper end of said conduit at the upper end thereof, and means to connect said first-mentioned container to said outer wall with said orifice spaced from and in line with said stopper.

PETER KLEID.